United States Patent
Suga (10) Patent No.: US 9,264,574 B2
(45) Date of Patent: Feb. 16, 2016

(54) IMAGE COMMUNICATION APPARATUS, CONTROL METHOD, AND STORAGE MEDIUM

(75) Inventor: Daisuke Suga, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 756 days.

(21) Appl. No.: 12/870,152

(22) Filed: Aug. 27, 2010

(65) Prior Publication Data

US 2011/0051189 A1    Mar. 3, 2011

(30) Foreign Application Priority Data

Sep. 1, 2009    (JP) .................................. 2009-202101

(51) Int. Cl.

| | |
|---|---|
| G06F 3/12 | (2006.01) |
| H04N 1/32 | (2006.01) |
| H04N 1/00 | (2006.01) |
| H04N 1/34 | (2006.01) |
| G06F 1/00 | (2006.01) |
| G05B 9/02 | (2006.01) |
| G06F 3/00 | (2006.01) |
| G03G 15/00 | (2006.01) |

(52) U.S. Cl.
CPC ....... H04N 1/32122 (2013.01); H04N 1/00832 (2013.01); H04N 1/00885 (2013.01); H04N 1/00891 (2013.01); H04N 1/00904 (2013.01); H04N 1/00928 (2013.01); H04N 1/346 (2013.01); H04N 2201/0094 (2013.01); H04N 2201/3202 (2013.01)

(58) Field of Classification Search
None
See application file for complete search history.

(56) References Cited

U.S. PATENT DOCUMENTS

| | | | |
|---|---|---|---|
| 2007/0279679 A1* | 12/2007 | Tanimoto | .................... 358/1.15 |
| 2008/0150952 A1* | 6/2008 | Koarai | ......................... 345/531 |
| 2009/0158009 A1* | 6/2009 | Sasama | ........................ 712/31 |
| 2009/0235098 A1* | 9/2009 | Matsunaga | ................... 713/320 |
| 2010/0033586 A1* | 2/2010 | Kim | .......................... 348/211.6 |

FOREIGN PATENT DOCUMENTS

JP    2002-264455 A    9/2002

* cited by examiner

*Primary Examiner* — Ashish K Thomas
*Assistant Examiner* — Neil R McLean
(74) *Attorney, Agent, or Firm* — Canon USA, Inc. IP Division (57) ABSTRACT

An apparatus supplies power to a communication unit that communicates with an external apparatus, and manages history information for each communication sequence in the communication unit in a mode where power supplied to a control unit is stopped. At that time, the apparatus assigns identification information unique to the communication unit to the history information when the apparatus is in a mode where power supplied to the control unit is stopped, and makes control when power supplied to the control unit is stopped or when the apparatus returns to the mode in which power is supplied to the control unit so that continuity of the history information managed by the control unit is ensured.

10 Claims, 7 Drawing Sheets

| SERIAL NUMBER | START TIME | SENDER/ RECIPIENT ADDRESS | COMMUNICATION MODE | NUMBER OF PAGES | COMMUNICATION RESULT |
|---|---|---|---|---|---|
| 5000 | 10/29 14:21 | BLOCKED CALLER ID | RECEIVE | 3 | OK |
| 5001 | 10/29 14:31 | BLOCKED CALLER ID | RECEIVE | 2 | OK |
| 5002 | 10/29 14:41 | BLOCKED CALLER ID | RECEIVE | 1 | OK |
| 5003 | 10/29 14:51 | BLOCKED CALLER ID | RECEIVE | 1 | OK |
| 0250 | 10/29 15:00 | 03-xxxx-xxxx | TRANSMIT | 1 | OK |
| 0251 | 10/29 15:03 | 06-xxxx-xxxx | TRANSMIT | 1 | OK |
| 0252 | 10/29 15:06 | 04-xxxx-xxxx | TRANSMIT | 1 | OK |
| 5004 | 10/29 15:11 | BLOCKED CALLER ID | RECEIVE | 1 | OK |

FIG.4

| TRANSMISSION SERIAL NUMBER | COMMUNICATION HISTORY INFORMATION ||||
|---|---|---|---|---|
| | START TIME | SENDER/ RECIPIENT ADDRESS | NUMBER OF PAGES | COMMUNICATION RESULT |
| 0 | 0 | 0 | 0 | 0 |
| 1 | 15:00 | 03-xxxx-xxxx | 1 | OK |
| 2 | 15:03 | 06-xxxx-xxxx | 1 | OK |
| 3 | 15:06 | 04-xxxx-xxxx | 1 | OK |

| RECEPTION SERIAL NUMBER | COMMUNICATION HISTORY INFORMATION ||||
|---|---|---|---|---|
| | START TIME | SENDER/ RECIPIENT ADDRESS | NUMBER OF PAGES | COMMUNICATION RESULT |
| 0 | 0 | 0 | 0 | 0 |
| 1 | 14:21 | BLOCKED CALLER ID | 3 | OK |
| 2 | 14:31 | BLOCKED CALLER ID | 2 | OK |
| 3 | 14:41 | BLOCKED CALLER ID | 1 | OK |
| 4 | 14:51 | BLOCKED CALLER ID | 1 | OK |
| 5 | 15:11 | BLOCKED CALLER ID | 1 | OK |

FIG.5

| TRANSMISSION SERIAL NUMBER | COMMUNICATION HISTORY INFORMATION | | | |
| --- | --- | --- | --- | --- |
| | START TIME | SENDER/ RECIPIENT ADDRESS | NUMBER OF PAGES | COMMUNICATION RESULT |
| 249 | 0 | 0 | 0 | 0 |
| 250 | 15:00 | 03-xxxx-xxxx | 1 | OK |
| 251 | 15:03 | 06-xxxx-xxxx | 1 | OK |
| 252 | 15:06 | 04-xxxx-xxxx | 1 | OK |

| RECEPTION SERIAL NUMBER | COMMUNICATION HISTORY INFORMATION | | | |
| --- | --- | --- | --- | --- |
| | START TIME | SENDER/ RECIPIENT ADDRESS | NUMBER OF PAGES | COMMUNICATION RESULT |
| 4999 | 0 | 0 | 0 | 0 |
| 5000 | 14:21 | BLOCKED CALLER ID | 3 | OK |
| 5001 | 14:31 | BLOCKED CALLER ID | 2 | OK |
| 5002 | 14:41 | BLOCKED CALLER ID | 1 | OK |
| 5003 | 14:51 | BLOCKED CALLER ID | 1 | OK |
| 5004 | 15:11 | BLOCKED CALLER ID | 1 | OK |

IMAGE COMMUNICATION APPARATUS, CONTROL METHOD, AND STORAGE MEDIUM

BACKGROUND OF THE INVENTION

1. Field of the Invention

The present invention relates to an image communication apparatus, a control method, and a storage medium.

2. Description of the Related Art

Generally, image communication apparatuses including digital multifunction peripherals (MFP) require maintenance management (maintenance operation) for performance retention and functional advancement. Each function unit of the MFP is checked and components necessary to be replaced are replaced in the maintenance operation.

Normally, the power to the MFP is temporarily stopped while the maintenance operation is performed so that the MFP does not fail during the operation. Thus, although it is desirable to keep the MFP in a state where communication of facsimile or electronic mail is always possible from the viewpoint of business operations, communication is not possible with the MFP while it is under the maintenance operation.

Japanese Patent Application Laid-Open No. 2002-264455 discusses a method to be used when a problem occurs with a function of an image communication apparatus including a facsimile communication function. By rendering only the failure-detected function inoperable, the maintenance operation of the image communication apparatus is performed without stopping the operation of other functions. According to this method, facsimile communication is possible even if power to each unit is stopped while the maintenance operation is performed, as power is continuously supplied to the communication unit that performs the facsimile communication.

However, according to the above-described conventional technique, if power to a unit, which manages communication history information of facsimile, or electronic mail communication is stopped, continuity of the communication history information managed by such a unit and communication history information which is generated if facsimile or electronic mail communication is performed by a communication unit while the maintenance operation is performed cannot be obtained.

SUMMARY OF THE INVENTION

According to an aspect of the present invention, an apparatus includes a control unit including a first storage unit and configured to manage history information using the first storage unit, a communication unit including a second storage unit and configured to perform communication with an external apparatus, and a power supply unit configured to supply power, wherein the power supply unit supplies power to the control unit and the communication unit in a first mode, and supplies power to the communication unit in a second mode, wherein the communication unit includes a generation unit configured to generate history information for each communication sequence, an assignment unit configured to assign identification information unique to the communication unit to the history information in the second mode, and a first storing unit configured to store the history information in the second storage unit in the second mode, and wherein the control unit includes an acquisition unit configured to acquire the history information stored in the second storage unit if the second mode is changed to the first mode, a change unit configured to change the assigned identification information so that the identification information is unique identification with respect to the control unit if the second mode is changed to the first mode, and a second storing unit configured to store the history information to which the changed identification information is assigned in the first storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Exemplary embodiments of the present invention described below will help understand various concepts including superordinate, intermediate, and subordinate concepts. The technical scope of the present invention is defined by the patent claims, and is not limited by the individual embodiments described below.

A first exemplary embodiment of the present invention will be described referring to FIGS. 1 to 4 and 6. According to the present exemplary embodiment, a digital multifunction peripheral is used as an example of the image communication apparatus.

<Configuration of Image Communication Apparatus>

First, referring to FIG. 1, a configuration example of a MFP 10 and its basic operation will be described. The MFP 10 is connected to a personal computer (PC) (host computer) 11 via a network (LAN: Local Area Network) 12. Generally, the MFP 10 is connected to the LAN 12 all the time, and operated on the LAN 12 together with another MFP (not illustrated), the PC 11, and a server (not illustrated).

The MFP 10 includes a communication unit (facsimile unit) 500 and is connected to a terminal 14, which is an external apparatus, via a telephone network 13, which is a public line. The MFP 10 is capable of facsimile communication by group 3 (G3) or group 5 (G4) facsimile transmission standards.

The MFP 10 includes an input/output function of image data. Further, according to a scanning function, the MFP 10 can input an image of a document as image data. Furthermore, the MFP 10 can input image data transmitted from the PC 11 via the LAN 12 or from another MFP via the telephone network 13.

On the other hand, the MFP 10 can output image data that has been input. In other words, the MFP 10 can perform image forming (printing) of the image data on a recording material (print paper). Further, the MFP 10 stores the image data that has been input in a hard disk drive (HDD) 103 or the like as digital data, or transfer the image data to another apparatus via the LAN 12 or the telephone network 13.

A controller (control) unit 100 is connected to a scanner unit 200 (i.e., image input device), an operation panel unit 300, a printer unit 400 (i.e., image output device), and a facsimile unit 500, and controls such units. The units in the control unit 100 are connected to one another by an internal bus, and transmit data via the internal bus.

A system on chip (SOC) 101 integrates a processor that controls the entire system and an application-specific integrated circuit (ASIC). The ASIC provides functions necessary for the system operation of the MFP. They are a random access memory (RAM) controller, a bus controller, a direct memory access (DMA) controller, an I/O port controller, a HDD controller, a timer, an interrupt processing circuit, and an image processing circuit.

A RAM 102 is used as a system work memory of the SOC 101 and an image memory used for temporarily storing the image data. A ROM 106 is a boot ROM, and stores a boot program of the system. The HDD 103 stores system software, image data, and a setting value.

The system software is a program used for realizing the copy, scanning, printing, and facsimile functions. The system software is loaded into the RAM 102 by the SOC 101 and executed.

When image data is input/output, an image processing unit 105 performs image processing such as encoding, decoding, rasterizing, and rotation of image data, conversion of multiple value into binary, and magnification. A LANC 109 is connected to the LAN 12. The LANC 109 inputs/outputs image data and inputs/outputs information concerning apparatus control. Further, the LANC 109 can transmit image data to the PC 11, another MFP, and a server on the LAN 12 and also receive image data from such apparatuses.

An operation panel I/F 108 is an interface to which the operation panel unit 300 is connected. The control unit 100 transmits image data to be displayed on an operation panel 301 to an operation panel control unit 302 via the operation panel I/F 108. The operation panel 301 includes a button, a numeric keypad, and an input device such as a touch panel.

By operating the operation panel, a user can input numerical values and give instructions to the MFP 10 such as a copy start instruction. The instruction input via the operation panel 301 is transmitted to the SOC 101 via the operation panel I/F 108. The SOC 101 instructs setting of the entire apparatus and execution of the functions of the apparatus based on the received instruction. According to the control of the SOC 101, processing of the MFP 10 such as printing, copying, scanning, and facsimile transmission is realized.

A printer I/F 104 is an interface connected to the printer unit 400. The printer I/F 104 is used for acquiring state information of a printer 402 from a printer control unit 401 of the printer unit 400, and transmitting a command to the printer 402. Further, the printer I/F 104 performs synchronous/asynchronous conversion of image data, and transmits print data to the printer unit 400.

A scanner I/F 107 is an interface connected to the scanner unit 200. The scanner I/F 107 is used for acquiring state information of a scanner 204 from a scanner control unit 201 of the scanner unit 200 and transmitting a command to the scanner 204. Further, the scanner I/F 107 performs synchronous/asynchronous conversion of image data, and transmits data scanned by the scanner 204 to the SOC 101.

The scanner unit 200 includes the scanner control unit 201, an image processing unit 202, a scanner motor 203, and the scanner 204. The scanner 204 optically reads (scans) a document. The scanner motor 203 drives an automatic document feeder or a scanner device in a document positioning plate.

Further, the scanner control unit 201 controls operation of the image processing unit 202, the scanner motor 203, and the scanner 204. The image processing unit 202 executes image processing, for example, A/D conversion of the image data scanned by the scanner 204 and shading processing. The image-processed image data is transferred to the control unit 100 via the scanner control unit 201.

The MFP 10 executes the scan function according to a scan instruction given by the user. When the user sets a document on the MFP 10 and gives a scan instruction using the operation panel 301 or the PC 11, the instruction is transmitted to the SOC 101.

The SOC 101 transmits a predetermined command to the scanner control unit 201 via the scanner I/F 107. According to this command, the scanning of the document by the scanner 204 is started. After the scanned image data is image-processed by the image processing unit 202, the image data is transmitted to the HDD 103 via the scanner I/F 107 and stored in the HDD, or transmitted to the PC 11 via the scanner I/F 107.

Further, the MFP 10 executes the copy function according to a copy instruction given by the user. When the user sets the document on the MFP 10 and gives the copy instruction via the operation panel 301 or the PC 11, the instruction is transmitted to the SOC 101.

The SOC 101 transmits a predetermined command to the scanner control unit 201 via the scanner I/F 107. According to this command, the scanning of the document by the scanner 204 is executed. After the scanned image data is image-processed by the image processing unit 202, the image data is stored in the HDD 103 via the scanner I/F 107.

Further, after the image data stored in the HDD 103 is image-processed by the image processing unit 105, the SOC 101 transmits the image-processed data to the printer unit 400 via the printer I/F 104. The printer control unit 401 prints the received image data on a sheet by the printer 402.

The number of printed pages is counted and the counter value is stored in a non-volatile memory 111. The counter value is used for charge processing. A circuit element of the non-volatile memory 111 is an element that maintains the stored data even if the power supply is stopped. The non-volatile memory 111 is, for example, a semiconductor disk (SSD), HDD, a ferroelectric RAM (FeRAM), a flash memory, or an electrically erasable programmable read-only memory (EEPROM).

In place of a non-volatile memory, a static RAM (SRAM) powered by a battery can also be used. Further, a similar circuit element is used for a non-volatile memory 505, which is included in the facsimile unit, described below.

A power supply unit 600 supplies necessary power to each unit. The power supply unit 600 performs AC-DC and DC-DC conversions of a power signal supplied from a power supply 15 such as a receptacle (for 100V or 200V, etc.). Power to each unit is supplied or stopped according to a control signal transmitted to each unit or according to an operation of a power switch 602 or a maintenance switch 603.

Figure 1:
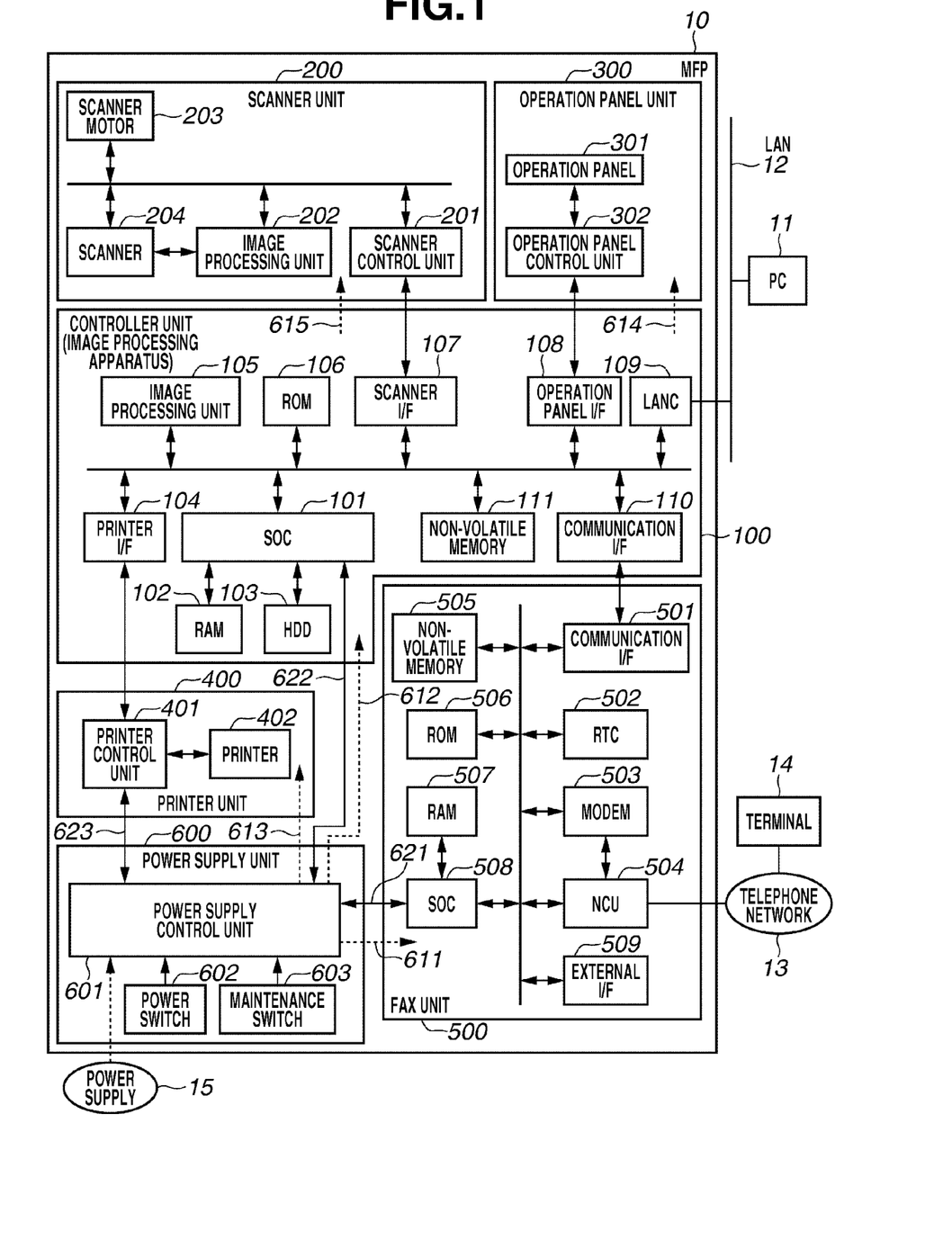
FIG. 1 is a block diagram of a system configuration example of a MFP according to a first exemplary embodiment of the present invention.

In FIG. 1, each arrow illustrated with a dotted line indicates a power supply line. Arrows 611, 612, 613, 614, and 615 illustrate power supplied to the facsimile unit 500, the control unit 100, the printer unit 400, the operation panel unit 300, and the scanner unit 200, respectively.

Regarding the MFP 10 of the present exemplary embodiment, power is supplied to the scanner unit 200 and the operation panel unit 300 from the power supply unit 600 via the control unit 100, and AC power is supplied to the printer unit 400 as needed.

A power supply control unit 601 controls the supply and the stopping of power according to the state of the MFP 10. For example, the power supply control unit 601 supplies power or stops supplying power based on a control signal 622 transmitted from the control unit 100 via an I/O port of the SOC 101.

Further, power supplied to the facsimile unit 500 is controlled based on a control signal 621 and power supplied to the printer unit 400 is controlled based on a control signal 623. According to the control signals described above, the power supply control unit 601 changes the state of a unit to a power saving state or causes the unit to return to the normal state. If the unit is in the power saving state, power supplied to the unit or a circuit in the unit, which is not active, is stopped.

Further, the power supply control unit 601 controls the power supplied to the units using the control signals when the mode of the MFP 10 is changed to a maintenance management mode (maintenance mode) described below, or the MFP 10 returns to the normal mode.

The facsimile unit 500 performs facsimile communication with the terminal 14 connected to the telephone network 13 according to a control of the SOC 101 of the control unit 100. A command is transmitted from the control unit 100 to the facsimile unit 500 via a communication I/F 110 and a communication I/F 501, and a response is transmitted via the same I/F. In this manner, the control unit 100 and the facsimile unit 500 can confirm the state of the other unit.

Although the facsimile unit 500 is described as a unit that transmits a facsimile to the terminal 14 connected to the telephone network 13 and receives a facsimile from the terminal 14, the present exemplary embodiment is not limited to such an example. By providing a function similar to that of the LANC 109, which is included in the control unit 100, in the facsimile unit, image data can be transmitted to the PC 11, another MFP, or a server on the LAN 12, and transmitted from such apparatuses.

A SOC 508 includes a function similar to that of the SOC 101 of the control unit 100. For productivity improvement reasons, limits may be imposed on the function of the SOC 508 or the processing ability of the SOC 508 may be reduced compared to ability of the SOC 101. The SOC 508 internally includes a CPU. The communication operation of the facsimile unit is controlled by the CPU reading out a program from the ROM 106 and executing the program.

Further, a RAM 507 is used as a work area of the SOC 508 or a temporary storage area of the image data. In order to prevent the image data stored in the RAM 507 from being lost at power failure, the RAM 507 is powered by a secondary battery. Although facsimile communication is described as an example of the communication in the following description, different communication can be applied to the present exemplary embodiment. Descriptions of communication using electronic mail or file transfer protocol (FTP) are similar to the descriptions below.

(Control of Facsimile Communication)

If the user sets the document on the MFP 10 and transmits a facsimile transmission instruction via the operation panel 301 or the PC 11, the instruction is transmitted to the SOC 101. The SOC 101 transmits a predetermined command to the scanner control unit 201 via the scanner I/F 107, and the document is scanned by the scanner 204 according to the command. The scanned image data is image-processed by the image processing unit 202 and transmitted to the HDD 103 via the scanner I/F 107. Then, the image data is stored in the HDD 103.

Further, the SOC 101 transfers the image data stored in the HDD 103 to the communication I/F 501 of the facsimile unit 500 via the communication I/F 110. The SOC 508 of the facsimile unit 500 stores the image data in the RAM 507. The SOC 508 executes facsimile transmission of the image data.

In transmitting a facsimile, the SOC 508 calls a telephone number of the terminal 14 by controlling a modem 503 and a network control unit (NCU) 504. After the NCU 504 is connected to the terminal 14 via the telephone network 13, the SOC 508 executes the facsimile communication based on ITU-T recommendations T.30, V.34, and V.17.

More specifically, the SOC 508 transfers the image data stored in the RAM 507 to the modem 503, and the modem 503 executes modulation/demodulation of the image data. After this processing, the image is transmitted to the terminal 14 by facsimile communication.

On the other hand, when a facsimile is received, the terminal 14 calls the telephone number of the MFP 10, and a calling signal is transmitted to the NCU 504 via the telephone network 13. The NCU 504 notifies the SOC 508 that a calling signal is detected. Then, the SOC 508 receives the facsimile from the terminal 14 by controlling the modem 503 and the NCU 504.

The received image data is transmitted to the RAM 507 via the modem 503 and the SOC 508 and stored in the RAM 5007 as it is in coded data based on JBIG, MMR, MR, or MH. Further, the image data is transferred to the communication I/F 110 via the communication I/F 501 and stored in the HDD 103. While the image data is being transferred, error of the coded data can be checked.

The SOC 101 decodes the coded data stored in the HDD 103, and the image processing unit 105 performs predetermined image processing of the data. After then, the SOC 101 transmits the data to the printer unit 400 via the printer I/F 104. The printer control unit 401 controls the printer 402 so that the received image data is printed on a sheet.

(Generation of Communication History Information)

The SOC 508 generates communication history information each time the facsimile unit 500 transmits or receives a facsimile. Since it is difficult to manage the communication history information using the internal memory of the facsimile unit 500 due to memory capacity reasons, the communication history information is normally stored in the HDD 103, which is a mass-storage device. In other words, after the communication history information generated by the facsimile unit 500 is temporarily stored in the RAM 507, the information is transferred to the control unit 100 and stored in the HDD 103.

Figure 3:
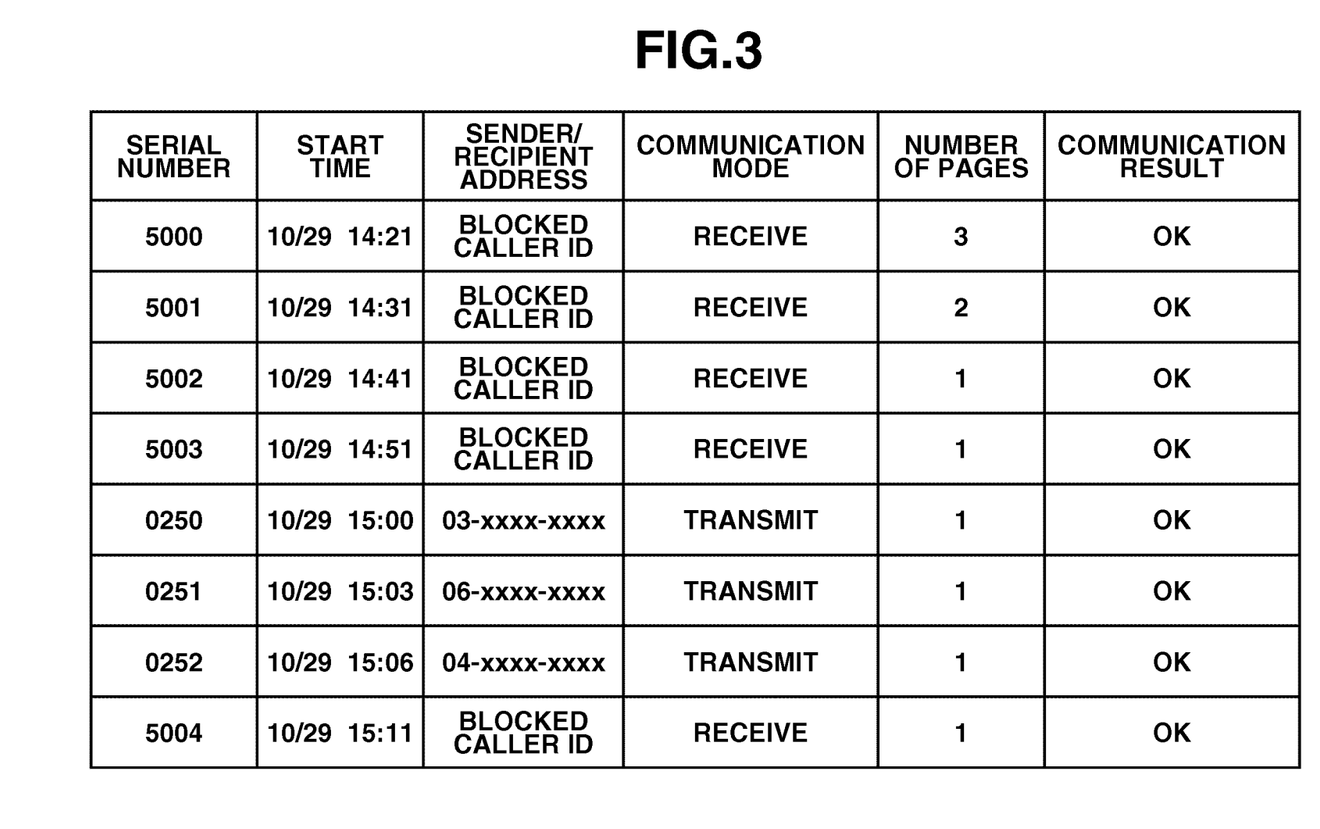
FIG. 3 is a table illustrating an example of communication history information of the MFP according to the first exemplary embodiment.

As illustrated in FIG. 3, the communication history information includes information such as communication start time, sender/recipient address (telephone number), communication mode, number of pages transmitted/received, and communication result. The communication start time is acquired by a real time clock (RTC) 502. The communication result is information concerning whether the communication has been successfully transmitted/received.

The sender/recipient telephone number is included in a digital identification signal (DIS) and a digital command signal (DCS), which are used in facsimile communication. The communication mode indicates whether the communication is transmission or reception of a facsimile. The communication history information can include information other than the above-described information such as transmission time.

In order to improve convenience of management of the communication history information, the MFP 10 assigns serial numbers that indicate the order of communication for each piece of communication history information as illustrated in FIG. 3.

In storing the communication history information transferred from the facsimile unit 500 in the HDD 103 when the facsimile communication is performed in the normal mode described below, the SOC 101 assigns a serial number to the communication history information before it stores the information. In other words, based on the serial numbers assigned to the communication history information already stored in the HDD 103, the SOC 101 assigns a new serial number to the communication history information to be newly stored in the HDD 103.

For example, if the last number of the serial numbers of the communication history information stored in the HDD 103 is "5000", then a number "5001" is generated and assigned to the communication history information to be stored next in the HDD 103. The serial number may be separately generated and assigned for the communication history information of transmitted facsimile and of received facsimile as illustrated in FIG. 3.

The generated communication history information of the transmitted facsimile and of the received facsimile is generated by the MFP 10 for each transmission. The generated information can be referred by an administrator of the MFP 10 as needed. Thus, the administrator can use the communication history information for, for example, security management, cost management concerning facsimile communication, and research of the MFP 10.

Next, a case where the electronic mail is transmitted by the facsimile unit 500 will be described. In this case, by providing a function similar to the LANC 109, which is included in the controller unit 100, to the facsimile unit, image data can be transmitted to the PC 11, another MFP, and a server on the LAN 12, and the facsimile unit 500 can receive image data transmitted from such apparatuses.

In transmitting an electronic mail, the SOC 508 controls a LAN control unit (not illustrated), which executes a function similar to the function executed by the LANC 109 in the facsimile unit 500. According to the control of the LAN control unit, the electronic mail is transmitted to the mail address of the terminal 14 or to an IP address. The SOC 508 executes the electronic mail communication with a mail server (not illustrated) or the PC 11 according to a protocol such as the simple mail transport protocol (SMTP) via the LAN 12.

In other words, the SOC 508 transfers the image data stored in the RAM 507 to the LAN control unit and the received image data is modulated/demodulated by the modem 503. Accordingly, image transmission using the electronic mail is performed with the PC 11.

On the other hand, in receiving an electronic mail, the SOC 508 inquires a post office protocol (POP) server (not illustrated) whether an electronic mail to be transmitted to the MFP 10 exists. If such an electronic mail for the MFP 10 exists, the SOC 508 receives the electronic mail by controlling the LAN control unit (not illustrated). Then, the received electronic mail is stored in the RAM 507.

Further, the electronic mail data is transferred to the communication I/F 110 via the communication I/F 501 and stored in the HDD 103. While the electronic mail is being transferred, error checking of the coded data can be performed. The SOC 101 decodes the coded data stored in the HDD 103. Then, the image processing unit 105 performs predetermined image processing of the data. After then, the data is transmitted to the printer unit 400 via the printer I/F 104. The printer control unit 401 controls the printer 402 so that the received data of the electronic mail is printed on a sheet.

Communication history information of the transmission/reception of the electronic mail is managed in a manner similar to that performed with the facsimile communication.

<Operation Mode of Image Communication Apparatus>

Next, operation mode of the MFP 10 according to the present exemplary embodiment will be described with reference to FIG. 2.

Figure 2:
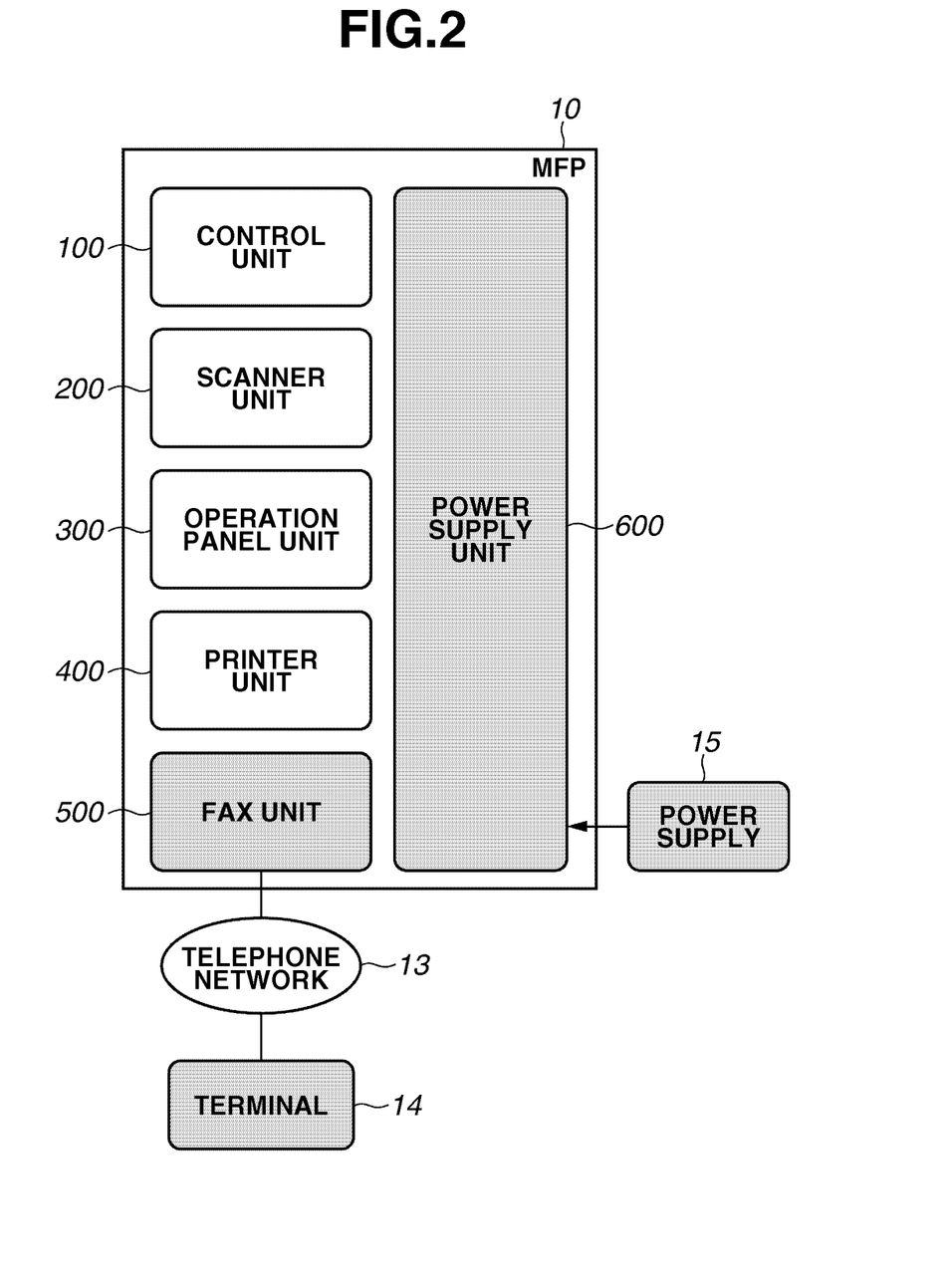
FIG. 2 is a block diagram illustrating an example of a power supply state of the MFP in a maintenance mode according to the first exemplary embodiment.

When the MFP 10 is in the normal operation mode (normal mode), power is supplied from the power supply unit 600 to all the units excluding the power supply unit 600 (e.g., the control unit 100, the scanner unit 200, the operation panel unit 300, the printer unit 400, and the facsimile unit 500 in FIGS. 1 and 2).

If a maintenance management (maintenance) operation of the MFP 10 is necessary in maintaining performance or enhancing a function of the MFP 10, for example, the printer unit 400 is checked or a component such as the RAM 102 or the ROM 106 of the control unit 100 is replaced. In such a case, an operator such as a service person, who is in charge of the maintenance of the MFP 10, temporarily stops the power supplied to the MFP 10.

The modes of the MFP 10 according to the present exemplary embodiment include the maintenance management mode (maintenance mode), which is a mode used for preventing the inconvenience that occurs when the power supply is stopped and the facsimile communication is unexecutable. Although the maintenance management mode is used as an example of the mode that is helpful in avoiding the inconvenience in the description below, the mode is not limited to such a maintenance management mode.

In other words, any mode can be used so long as power to the power supply controller unit 100 is stopped and power to the facsimile unit 500 is maintained in that mode. According to the present exemplary embodiment, the normal mode corresponds to a first mode and the maintenance mode corresponds to a second mode.

In FIG. 2, the shaded areas are the energized portions in the maintenance mode. As illustrated in FIG. 2, if the MFP 10 is in the maintenance mode, power is supplied from the power supply unit 600 to only the facsimile unit 500, and power is not supplied to other units.

In changing the mode of the MFP 10, which is operating in the normal mode, to the maintenance mode, for example, the maintenance switch 603 illustrated in FIG. 1 is used. The maintenance switch 603 is connected to the power supply control unit 601 and is provided on the MFP 10. According to the MFP 10 of the present exemplary embodiment, if the maintenance switch 603 is operated by the operator, the mode is changed from the normal mode to the maintenance mode.

Further, if the MFP 10 is in the maintenance mode and the maintenance switch 603 or the power switch 602 is operated, the MFP 10 returns to the normal mode. The mode of the MFP 10 according to the present exemplary embodiment can be changed from the normal mode to the maintenance mode and further, from the maintenance mode to the normal mode while the supply of power to the facsimile unit 500 is continued.

If power is supplied to the facsimile unit 500 in the maintenance mode, the facsimile unit 500 can continuously transmit/receive a facsimile even if the maintenance is performed. Further, if the facsimile unit includes a function of the LANC 109, communication via the LAN such as electronic mail communication can be continuously performed while the maintenance is being performed.

The above-described change processing and return processing can be executed by operating an input device provided on the operation panel 301. Further, the maintenance switch 603 can be provided on the operation panel 301. In the cases above, the power supply control unit 601 supplies power to the operation panel unit 300 as well as to the facsimile unit 500 in the maintenance mode.

As described above, the communication history information is generated by the facsimile unit 500 when the MFP 10 transmits/receives a facsimile. When the MFP 10 is in the normal mode, the MFP 10 stores the generated communication history information in the HDD 103 of the control unit 100. At that time, the control unit 100 assigns a unique serial number to the communication history information and manages it.

On the other hand, since the power is not supplied from the power supply unit 600 to the control unit 100 when the MFP 10 is in the maintenance mode, the communication history information cannot be stored in the HDD 103. Thus, according to the present exemplary embodiment, the MFP 10 temporarily stores the communication history information generated in the maintenance mode in the non-volatile memory 505, which is an internal memory of the facsimile unit 500.

When the MFP 10 returns to the normal mode from the maintenance mode, the communication history information stored in the non-volatile memory 505 is transferred to the HDD 103 and stored. According to this processing, the communication history information generated in the maintenance mode is appropriately transferred to the HDD 103.

Thus according to the MFP 10 of the present exemplary embodiment, the continuity of the communication history information using the communication history information obtained before the mode is changed to the maintenance mode and the communication history information obtained during the maintenance mode is ensured. As an internal memory for temporary storing the communication history information, the RAM 507 may be used in place of the non-volatile memory 505. The internal memory corresponds to a temporary storage unit.

According to the processing concerning the maintenance mode described above, the management of the serial number becomes an issue. In the maintenance mode, since the facsimile unit 500 temporarily stores the generated communication history information in the non-volatile memory 505, it is necessary to assign a serial number to the communication history information. When the facsimile unit assigns a serial number to the communication history information, the facsimile unit 500 is unable to refer to the last number of the serial numbers of the communication history information stored in the HDD 103 to which the power supply is stopped.

Thus, according to the present exemplary embodiment, the facsimile unit 500 temporarily assigns a unique serial number to the generated communication history information. In this case, the continuity of the serial number assigned to the communication history information when the facsimile unit 500 is in the maintenance mode and the serial number of the communication history information stored in the HDD 103 cannot be ensured.

Thus, according to the MFP 10 of the present exemplary embodiment, when the MFP 10 returns to the normal mode from the maintenance mode, the serial number of the communication history information transferred from the non-volatile memory 505 to the HDD 103 is changed so that the serial number of the transferred communication history information is sequentially numbered with the serial numbers of the communication history information stored in the HDD 103. The above-described processing will be described in detail below.

<Maintenance Mode Change Processing and Return Processing>

Now, the change processing from the normal mode to the maintenance mode and the return processing from the normal mode to the maintenance mode regarding the MFP 10 of the present exemplary embodiment will be described with reference to FIG. 6.

Figure 6:
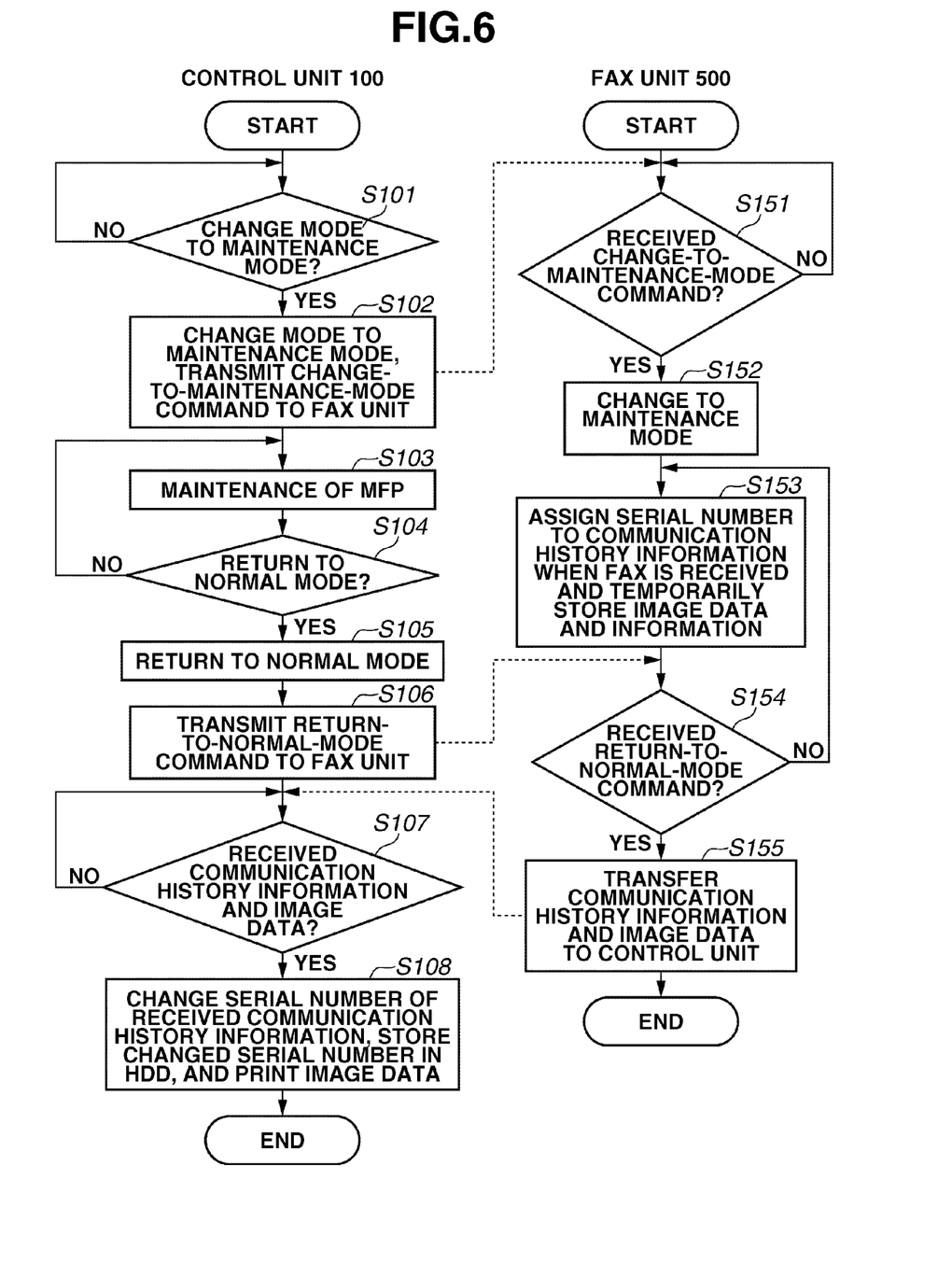
FIG. 6 is a flowchart illustrating processing procedures of change processing from a normal mode to the maintenance mode and return processing from the maintenance mode to the normal mode according to the first exemplary embodiment.

In FIG. 6, steps S101 to S108 are processing procedures performed by the control unit 100 and steps S151 to S155 are processing procedures performed by the facsimile unit 500. The processing procedures are executed by the control of the SOC 101 and the SOC 508, respectively. The broken lines in FIG. 6 indicate the flow of the control signal and data that is transmitted between the control unit 100 and the facsimile unit 500.

(Change to Maintenance Mode from Normal Mode)

When the processing in FIG. 6 is started, the MFP 10 is operating in the normal mode. In step S101, the SOC 101 determines whether the operator has given an instruction to change the mode from the normal mode to the maintenance mode. The instruction is input by the operator using the operation panel 301 or the maintenance switch 603.

When the SOC 101 detects that such an instruction is input, the SOC 101 determines that an instruction to change the mode to the maintenance mode is given. In step S101, if the SOC 101 determines that such an instruction is not yet given (NO in step S101), the processing of step S101 is repeated. On the other hand, if the SOC 101 determines that the instruction has been given (YES in step S101), the processing proceeds to step S102.

In step S102, the SOC 101 changes the mode to the maintenance mode and also transmits a mode change command to the facsimile unit 500. If the SOC 101 is executing some kind of job (e.g., copying, scanning, printing, facsimile transmission/reception) of the MFP 10, the SOC 101 may wait until the execution of the job is completed, and then start the changing of the mode to the maintenance mode.

In such a case, after the job is completed, the SOC 101 changes the mode to the maintenance mode and also transmits the mode change command to the facsimile unit 500. Further, the SOC 101 can forcibly terminate the job and change the mode to the maintenance mode.

In step S102, when the SOC 101 changes the mode to the maintenance mode, the SOC 101 also controls the power supply control unit 601 using the control signal 622 so that power supplied from the power supply unit 600 to all the units excluding the facsimile unit 500 is stopped as illustrated in FIG. 2. After then, the processing proceeds to step S103.

If timer-controlled facsimile transmission or broadcast facsimile transmission is to be executed while the MFP 10 is in the maintenance mode, the SOC 101 can control the control unit 100 so that image data to be transmitted and address data is transmitted in advance to the facsimile unit 500 and stored in the RAM 507. Further, when the MFP 10 returns to the normal mode from the maintenance mode, the SOC 101 can cause one of the storage portions to store information indicating that the MFP 10 is not started up after power off but is returned to the normal mode from the maintenance mode.

For example, when the normal mode is changed to the maintenance mode, the SOC 101 may set a flag that the mode is changed to the maintenance mode. The flag is stored in a non-volatile storage unit (the non-volatile memory 111 or the HDD 103). Further, the flag may be stored in a non-volatile memory (not illustrated) in the power supply control unit 601.

In step S103, when the mode of the MFP 10 is changed to the maintenance mode, the above-described maintenance operation of the MFP 10 is executed by the operator. The maintenance processing is continued until a return instruction used for returning the MFP 10 to the normal mode is given by the operator.

Next, the processing performed by the facsimile unit 500 will be described. In step S151, the SOC 508 of the facsimile unit 500, which is operating in the normal mode, repeatedly determines whether the mode change command is transmitted from the control unit 100. If the SOC 508 determines that the mode change command is not yet received (NO in step S151), the operation performed in the normal mode is continued, and the processing in step S151 is repeated. On the other hand, if the SOC 508 determines that the mode change command is received (YES in step S151), the processing proceeds to step S152.

In step S152, the SOC 508 changes the mode to the maintenance mode. At that time, the SOC 508 initializes the serial number assigned to the communication history information described below. According to the initialization, the initial value is set, for example, to "0". The initial value is a known value to the control unit 100 as well as to the facsimile unit 500.

In step S153, the SOC 508 independently executes the facsimile communication without communicating with the control unit 100. In other words, the SOC 508, which is in the maintenance mode, continuously executes the facsimile communication according to the power supplied from the power supply control unit 601.

In performing the facsimile transmission, the SOC 508 transmits the image data, which has been transmitted from the control unit 100 before the mode has been changed to the maintenance mode and stored in the RAM 507, to a designated address. On the other hand, in receiving a facsimile, the received image data and communication history information for each reception is stored in the non-volatile memory 505.

The SOC 508 temporarily stores the communication history information of each transmission/reception of the facsimile in the non-volatile memory 505. Before storing the communication history information, the SOC 508 assigns a serial number unique to the facsimile unit 500 to the communication history information and then stores the information. The storage processing corresponds to processing performed by the temporary storage unit.

Figure 4:
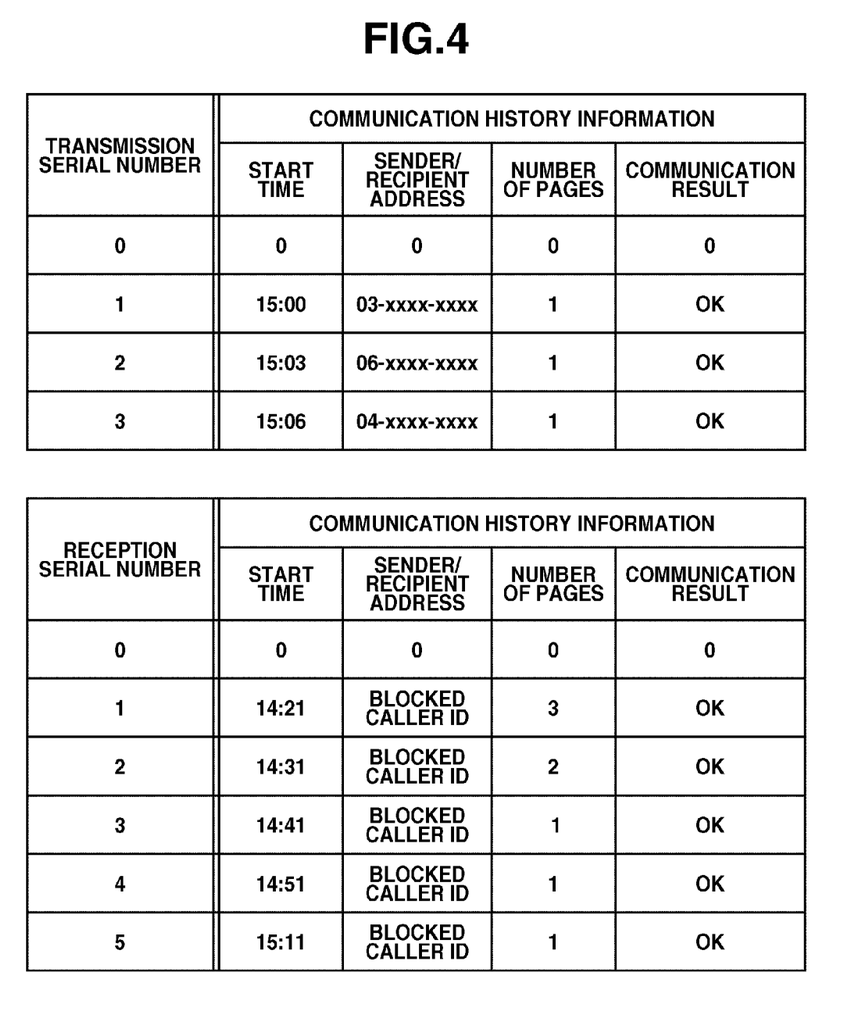
FIG. 4 is a table illustrating an example of communication history information and serial numbers that are assigned when the MFP is in the maintenance mode according to the first exemplary embodiment.

FIG. 4 illustrates a case where two different gropes of serial numbers are separately assigned to the communication history information for facsimile transmission and reception, respectively. Further, both of the serial numbers for the facsimile transmission and reception are started from 0. Further, in FIG. 4, each of the items corresponding to the communication history information with the serial number 0 is also set to 0, and the information is stored in advance in the non-volatile memory 505.

In this case, the SOC 508 refers to the last number of the serial numbers stored in the non-volatile memory 505 each time a new facsimile is transmitted/received, and assigns an integer, which is obtained by incrementing the last number of the serial numbers by 1, to the communication history information.

Although the communication unit 500 assigns a serial number to the communication history information and manages it according to the description above, the method for managing the communication history information is not limited to the above-described example. In other words, any method can be used so long as the identification information is issued according to a certain rule.

Further, according to the description above, two different gropes of serial numbers are assigned to the communication history information for facsimile transmission and reception respectively, and then managed. However, the management method is not limited to such an example. For example, the communication executed while the MFP 10 is in the maintenance mode can be identified by using a character string such as an alphabet each time the communication is performed. Further, random numbers may also be used for the identification of the information.

According to the present exemplary embodiment, any method can be used so long as the SOC 508 can assign identification information independent of the control of the SOC 101, which is in the power off state, so that each piece of communication, which is executed while the MFP 10 is in the maintenance mode, can be identified.

Further, the control unit 100 may be configured in such a manner that it issues the identification information according to a certain rule. In this case, for example, the SOC 101 functions as an identification information issue unit. If the control unit 100 issues the identification information according to a certain rule, the communication unit 500 can be configured so that it issues identification information according to the same rule.

In step S154, the SOC 508 repeatedly determines whether a command to return the facsimile unit 500 to the normal mode from the maintenance mode is transmitted from the control unit 100. If the SOC 508 determines that such a command is not yet received (NO in step S154), the processing returns to step S153, and the operation in the maintenance mode performed in step S153 is continued.

On the other hand, if the SOC 508 determines that such a command is transmitted from the control unit 100 and received (YES in step S154), then the processing proceeds to step S155. Further, if the memory capacity is not sufficient, the SOC 508 can transmit an error signal to the terminal with which the communication is being performed, and the facsimile communication may be stopped. Further, in that case, the subsequent facsimile transmission/reception may be cancelled.

If the facsimile transmission/reception is performed in the maintenance mode, the MFP 10 can execute processing that notifies the user or the operator of such transmission/reception.

As for such processing, for example, if a speaker or a light-emitting diode (LED) is provided on the facsimile unit 500 or the power supply unit 600 of the MFP 10, the speaker may produce a sound or the LED may flash when the facsimile transmission/reception is performed. In this manner, the user can easily confirm that the facsimile communication has been performed in the maintenance mode, and the convenience will be improved.

Further, a storage medium such as a USB memory or a flash memory can be connected to an external I/F 509 of the facsimile unit 500 so that the received image data can be stored in the storage medium. Furthermore, a communication cable such as a USB cable can be connected to the external I/F 509 so that the received image data can be transmitted via the communication cable and stored in an external apparatus such as a PC.

As a result, even if the maintenance operation takes a considerable amount of time, facsimile communication is not stopped due to insufficient memory capacity of the facsimile unit 500 as described above.

(Return to Normal Mode from Maintenance Mode)

Referring back again to the processing of the control unit 100, in steps S104 and S105, since the power supplied to the control unit 100 is stopped, the processing is executed by the control of the power supply control unit 601.

In step S104, the power supply control unit 601 determines whether a return instruction used for returning the MFP 10 to the normal mode is given by the operator. The instruction is input by the operator using the operation panel 301, the power switch 602, or the maintenance switch 603.

In step S104, if the power supply control unit 601 determines that the recovery instruction is not yet given (NO in step S104), the processing returns to step S103, and the maintenance mode is continued. On the other hand, if the recovery instruction is determined as given (YES in step S104), the processing proceeds to step S105. In step S105, the power supply control unit 601 resumes the power supply to all the units excluding the facsimile unit 500 so that the MFP 10 returns to the normal mode from the maintenance mode. Accordingly, the control unit 100 can perform the control operation again. After then, the processing proceeds to step S106.

If the power is supplied to the control unit 100 again, the SOC 101 may determine whether the MFP 10 is started from the power off state or the maintenance mode has been changed to the normal mode by referring to the flag stored in the non-volatile memory 111 in step S102.

In that case, if the SOC 101 determines that the MFP 10 is started from the power off state, the SOC 101 initializes the facsimile unit 500 via the communication I/F 110. On the other hand, if the SOC 101 determines that the normal mode has been changed from the maintenance mode, the facsimile unit 500 does not perform the initialization.

In step S106, the SOC 101 transmits a command to the facsimile unit 500 via the communication I/F 110 informing that the facsimile unit 500 is to return to the normal mode from the maintenance mode, and the processing proceeds to step S107. In step S107, the SOC 101 waits until the communication history information of the facsimile transmission/reception performed in the maintenance mode and the received image data are transmitted from the facsimile unit 500.

If the SOC 508 of the facsimile unit 500 receives the command to return the facsimile unit 500 to the normal mode, the processing proceeds from step S154 to S155. In step S155, the SOC 508 starts the return processing from the maintenance mode to the normal mode. In other words, the SOC 508 transmits the communication history information and the received data, which has been temporarily stored in the non-volatile memory 505 in the maintenance mode, to the control unit 100.

After transmitting the information and data, the SOC 508 deletes the information stored in the non-volatile memory 505, and frees the memory space. When the facsimile unit 500 returns to the normal mode, the facsimile unit 500 performs the facsimile communication again according to the control of the control unit 100.

On the other hand, in step S107, the SOC 101 determines whether the control unit 100 has received the communication history information and the data transmitted from the facsimile unit 500. If the SOC 101 determines that such information and data is not yet received (NO in step S107), the determination processing is repeated. On the other hand, if the information and data is determined as received (YES in step S107), the processing proceeds to step S108.

In step S108, the SOC 101 changes the serial number of the received communication history information so as to ensure continuity of the serial number of the received communication history information and the serial number of the communication history information stored in the HDD 103 before the mode has been changed to the maintenance mode. In other words, the SOC 101 changes the serial number of the received communication history information so that the serial numbers are serially numbered.

Further, the SOC 101 performs such control that the image data received in the maintenance mode is printed by the printer 402.

For example, if the last number of the serial numbers assigned to the communication history information for transmission stored in the HDD 103 is 4999, the serial numbers of the received communication history information are changed so that that they are continued from 5000.

If the SOC 101 receives the communication history information for transmission illustrated in FIG. 4, since the serial numbers of the communication history information are the numbers 0 to 3 having the initial value 0, the serial numbers are changed to 5001 to 5003. Similar change processing is executed for the serial numbers of the communication history information for reception.

According to the processing described above, the communication history information after the serial numbers are changed will be as illustrated in FIG. 3. After then, the SOC 101 stores each piece of the received communication history information and the reassigned serial number of the communication history information in the HDD 103. According to the above-described processing, the MFP 10 including the control unit 100 and the facsimile unit 500 returns to the normal mode, and the operation of the normal mode will be continued.

If the serial number for transmission or for reception assigned to the communication history information transmitted from the facsimile unit 500 is 0 and thus unchanged, it means that no facsimile has been transmitted or received in the maintenance mode. Further, the SOC 101 may print the received image data by using the printer 402 to which power is supplied again. Further, the communication history information may be printed together with the received image data as a facsimile communication result report. The user may arbitrary set whether to print the communication history information or not.

Although the facsimile communication is described above, the present invention is not limited to such an example. For example, if the facsimile unit includes a function of the LANC 109, it can also be applied to communication via the LAN.

Further, although the serial numbers of the received communication history information are changed so that continuity of the serial numbers with respect to the serial numbers of the communication history information stored in the HDD 103 before the mode is changed to the maintenance mode is ensured, the method for managing the communication history information is not limited to such a method. For example, unique identification information presented in alphabets or random numbers assigned by the facsimile unit 500 may be changed into unique identification information that follows the management method used by the SOC 101.

Furthermore, although the control unit 100 receives the communication history information and the data from the SOC 508 that has transmitted the communication history information of the communication executed in the maintenance mode and the data to the control unit 100 in step S155, the present information is not limited to such an example. For example, the SOC 101 that has returned to the normal mode from the maintenance mode may obtain the communication history information and the data by reading out the communication history information executed in the maintenance mode.

Further, although the normal mode and the maintenance mode (maintenance management mode) are taken as examples of the modes applied to the present exemplary embodiment in the description above, the modes of the present exemplary embodiment are not limited to such examples. For example, two modes including a mode in which both a unit managing the communication history information and the communication unit are operating, and a mode in which the unit managing the communication history information is stopped but the communication unit is operating, can be used as the modes applied to the present exemplary embodiment.

In such a case, the normal mode may be interpreted as "a state where a unit managing the communication history information and the communication unit are both operating" and the maintenance mode may be interpreted as "a state where the unit managing the communication history information is stopped but the communication unit is operating".

As described above, the image communication apparatus according to the present exemplary embodiment supplies power to the communication unit that communicates with an external apparatus. In a mode where the supply of power to the control unit is stopped, communication history information of each transmission/reception is temporarily managed in the communication unit. At that time, identification information unique to the communication history information is assigned by the communication unit.

Further, when the image communication apparatus is returned to the normal mode from the maintenance management mode, the control unit acquires the communication history information and changes the identification information of the communication history information so that the identification information is changed to the identification information of the communication history information stored in the storage unit of the control unit, and stores the changed identification information in the storage unit.

According to this processing, communication history information that is generated in a mode where power to the control unit is stopped, is prevented from not being managed together with the communication history information that is generated during the normal operation and stored in the storage unit of the control unit, and thus continuity of the communication history information is ensured.

Further, the continuity of the serial numbers of the communication history information stored in the storage unit and the serial numbers assigned to the communication history information generated in the mode where the power to the control unit is stopped, can be ensured.

Next, a second exemplary embodiment of the present invention will be described with reference to FIGS. 5 and 7. As an alternate version of the first exemplary embodiment, the image communication apparatus according to the present exemplary embodiment causes the control unit to transmit information of the latest identification information of the communication history information managed by the control unit to the communication unit before the normal mode is changed to the maintenance mode.

In the description below, only the portions that are different from the first exemplary embodiment will be described. Further, although the serial number is used in the following description, the identification information is not limited to the serial number. If the control unit is configured so that identification information is issued according to a certain rule and identification information of the communication unit is also issued according to the same rule, such identification information is also applicable.

(Mode Change from Normal Mode to Maintenance Mode)

Figure 7:
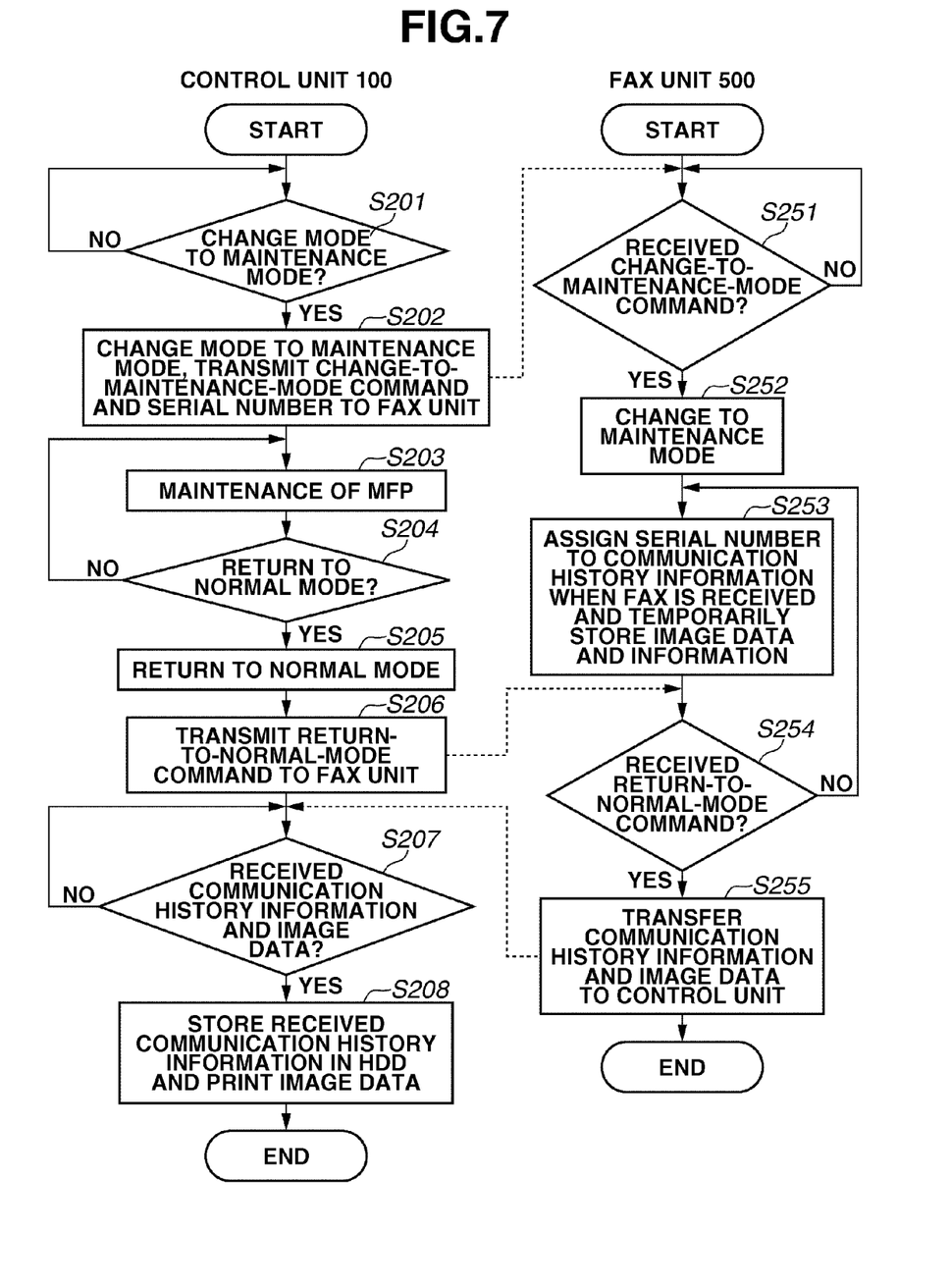
FIG. 7 is a flowchart illustrating processing procedures of change processing from the normal mode to the maintenance mode and return processing from the maintenance mode to the normal mode according to the second exemplary embodiment.

In FIG. 7, processing in step S201 is similar to that in step S101. In step S202, the SOC 101 changes the mode to the maintenance mode and transmits the change command to change to the maintenance mode, to the facsimile unit 500. Further, the SOC 101 notifies the facsimile unit 500 of the last number of the serial numbers of the communication history information stored in the HDD 103.

As the processing used in changing the mode to the maintenance mode, the SOC 101 controls the power supply control unit 601, as is performed in step S102, and controls the processing used in stopping the supply of power from the power supply unit 600 to the units other than the facsimile unit 500. After then, the processing proceeds to step S203. Steps S203 and S204 are similar to steps S103 and S104.

In step S251, the SOC 508 of the facsimile unit 500 repeatedly determines whether the mode change command is transmitted from the control unit 100. If the SOC 508 determines that the mode change command is not yet received (NO in step S251), the operation performed in the normal mode is continued, and the processing in step S151 is repeated.

On the other hand, if the SOC 508 determines that the mode change command is received (YES in step S251), the processing proceeds to step S252. At that time, the last number of the serial numbers stored in the HDD 103 is also transmitted from the control unit 100.

In step S252, the SOC 508 changes the mode to the maintenance mode. At that time, the SOC 508 initializes the serial number assigned to the communication history information using the serial number that has been notified. After then, the processing proceeds to step S253. Steps S253 and S254 are similar to steps S153 and S154.

Figure 5:
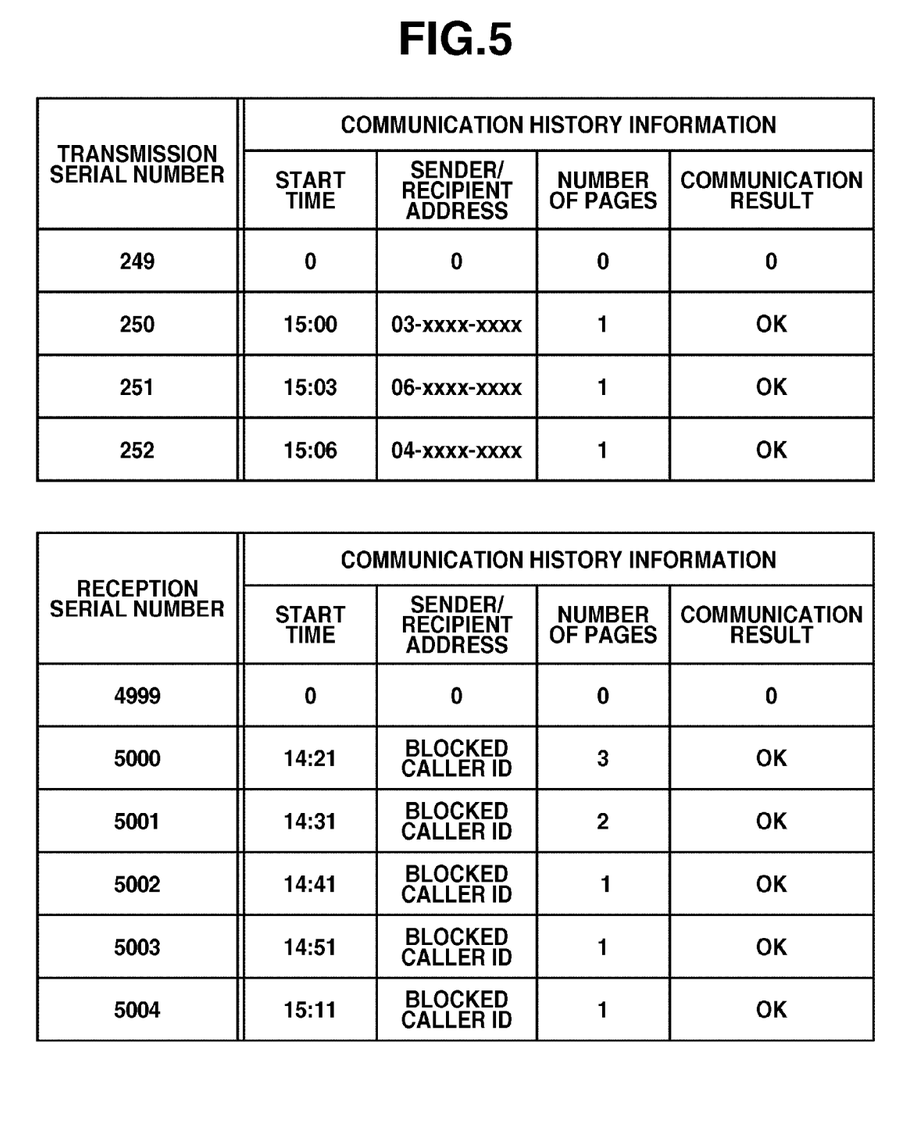
FIG. 5 is a table illustrating an example of communication history information and serial numbers that are assigned when the MFP is in the maintenance mode according to a second exemplary embodiment of the present invention.

If the serial number for transmission and the serial number for reception notified in step S251 are "249" and "4999", the communication history information illustrated in FIG. 5, for example, is generated by the facsimile unit 500. As illustrated in FIG. 5, serial integer values are assigned to each piece of communication history information as the serial numbers based on the notified serial number.

(Returning to Normal Mode from Maintenance Mode)

In FIG. 7, steps S205 to S207 concerning the control unit 100 are similar to steps S105 to S107 in FIG. 6, and step S255 concerning the facsimile unit 500 is similar to step S155.

In step S208, the SOC 101 stores the communication history information transmitted from the facsimile unit 500 and the image data in the HDD 103. Although the serial numbers assigned to the received communication history information are changed in the first exemplary embodiment, the serial numbers are not changed according to the present exemplary embodiment. This is because the facsimile unit 500 has already assigned consecutive numbers based on the number notified by the control unit 100 in advance. Thus numbers that are in continuity with the serial numbers of the communication history information stored in the HDD 103 are assigned to the generated communication history information generated in the maintenance mode.

According to the above-described processing, the MFP 10 including the control unit 100 and the facsimile unit 500 returns to the normal mode, and the operation performed in the normal mode is continued.

As described above, the control unit of the image communication apparatus according to the present exemplary embodiment informs the latest identification information of the communication history information managed by the control unit to the communication unit when the mode is changed from the normal mode to a mode in which the supply of power to the control unit is stopped.

In the mode in which the supply of power to the control unit is stopped, the communication unit assigns new identification information to the generated communication history information based on the notified identification information.

Further, when the control unit returns to the normal mode from the mode in which the supply of power is stopped, the control unit stores the communication history information transferred from the communication unit in the storage unit without changing the assigned identification information. In this way, the image communication apparatus according to the present exemplary embodiment can obtain an effect similar to that obtained from the first exemplary embodiment.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-202101 filed Sep. 1, 2009, which is hereby incorporated by reference herein in its entirety.

What is claimed is:

1. A facsimile apparatus comprising:
a first unit including a first storage unit;
a second unit including a second storage unit; and
a control unit configured to perform a facsimile communication with an external apparatus in a first mode in which the facsimile communication is controlled by the first unit, and to perform a facsimile communication with the external apparatus in a second mode in which the facsimile communication is controlled by the second unit,
wherein the second unit includes:
a generation unit configured to generate history information for each facsimile communication performed in the second mode;
an assignment unit configured to assign identification information unique to the second unit to the history information in the second mode; and
a first storing unit configured to store the history information in the second storage unit in the second mode, and
wherein the first unit includes:
an acquisition unit configured to acquire the history information stored in the second storage unit if the second mode is to be shifted to the first mode;
a change unit configured to change the assigned identification information of the acquired history information to identification information which is sequential from identification information of history information stored in the first storage unit in the first mode; and
a second storing unit configured to store the history information to which the changed identification information is assigned in the first storage unit.

2. The apparatus according to claim 1, wherein the assignment unit assigns the identification information according to a predetermined rule.

3. The apparatus according to claim 1, wherein the first unit includes an identification information issue unit configured to issue the identification information according to a predetermined rule.

4. The apparatus according to claim 1, wherein the identification information is a serial number.

5. The apparatus according to claim 1, further comprising a second notifying unit configured to notify a user of information indicating that the facsimile communication in the second mode has been performed.

6. A facsimile apparatus comprising:
a first unit including a first storage unit;
a second unit including a second storage unit; and
a control unit configured to perform a facsimile communication with an external apparatus in a first mode in which the facsimile communication is controlled by the first unit, and to perform the facsimile communication with the external apparatus in a second mode in which the facsimile communication is controlled by the second unit,
wherein the second unit includes:
a generation unit configured to generate history information for each communication performed in the second mode;
an assignment unit configured to assign identification information to the history information based on identification information notified by the first unit in the second mode; and
a first storing unit configured to store the history information in the second storage unit in the second mode, and
wherein the first unit includes:
a first notification unit configured to notify the second unit of latest identification information if the first mode is to be shifted to the second mode;
an acquisition unit configured to acquire the history information stored in the second storage unit; and
a second storing unit configured to store the acquired history information in the first storage unit.

7. A control method of a facsimile apparatus including a first unit including a first storage unit, a second unit including a second storage unit, and a control unit configured to perform a facsimile communication with an external apparatus in a first mode in which the facsimile communication is controlled by the first unit, and to perform a facsimile communication with the external apparatus in a second mode in which the facsimile communication is controlled by the second unit, the method comprising:

generating history information for each facsimile communication performed in the second mode;

assigning identification information unique to the second unit to the history information in the second mode;

storing the history information in the second storage unit in the second mode;

acquiring the history information stored in the second storage unit if the second mode is to be shifted to the first mode;

changing the assigned identification information of the acquired history information to identification information which is sequential from the identification information of history information stored in the first storage unit in the first mode; and storing the history information to which the changed identification information is assigned in the first storage unit.

8. A non-transitory computer-readable recording medium storing a program for causing a computer to execute the control method of the apparatus according to claim 7.

9. A control method of a facsimile apparatus including a first unit including a first storage unit, a second unit including a second storage unit, and a control unit configured to perform a facsimile communication with an external apparatus in a first mode in which the facsimile communication is controlled by the first unit, and to perform a facsimile communication with the external apparatus in a second mode in which the facsimile communication is controlled by the second unit, the method comprising:

generating history information for each facsimile communication performed in the second mode;

assigning identification information to the history information based on identification information notified by the first unit in the second mode;

storing the history information in the second storage unit in the second mode;

notifying the second unit of latest identification information if the first mode is to be shifted to the second mode;

acquiring the history information stored in the second storage unit; and storing the acquired history information in the first storage unit.

10. A non-transitory computer-readable recording medium storing a program for causing a computer to execute the control method of the facsimile apparatus according to claim 9.

* * * * *